Dec. 21, 1943.                M. J. MARTY                2,337,483
                            FASTENING DEVICE
                          Filed July 10, 1942          2 Sheets-Sheet 1
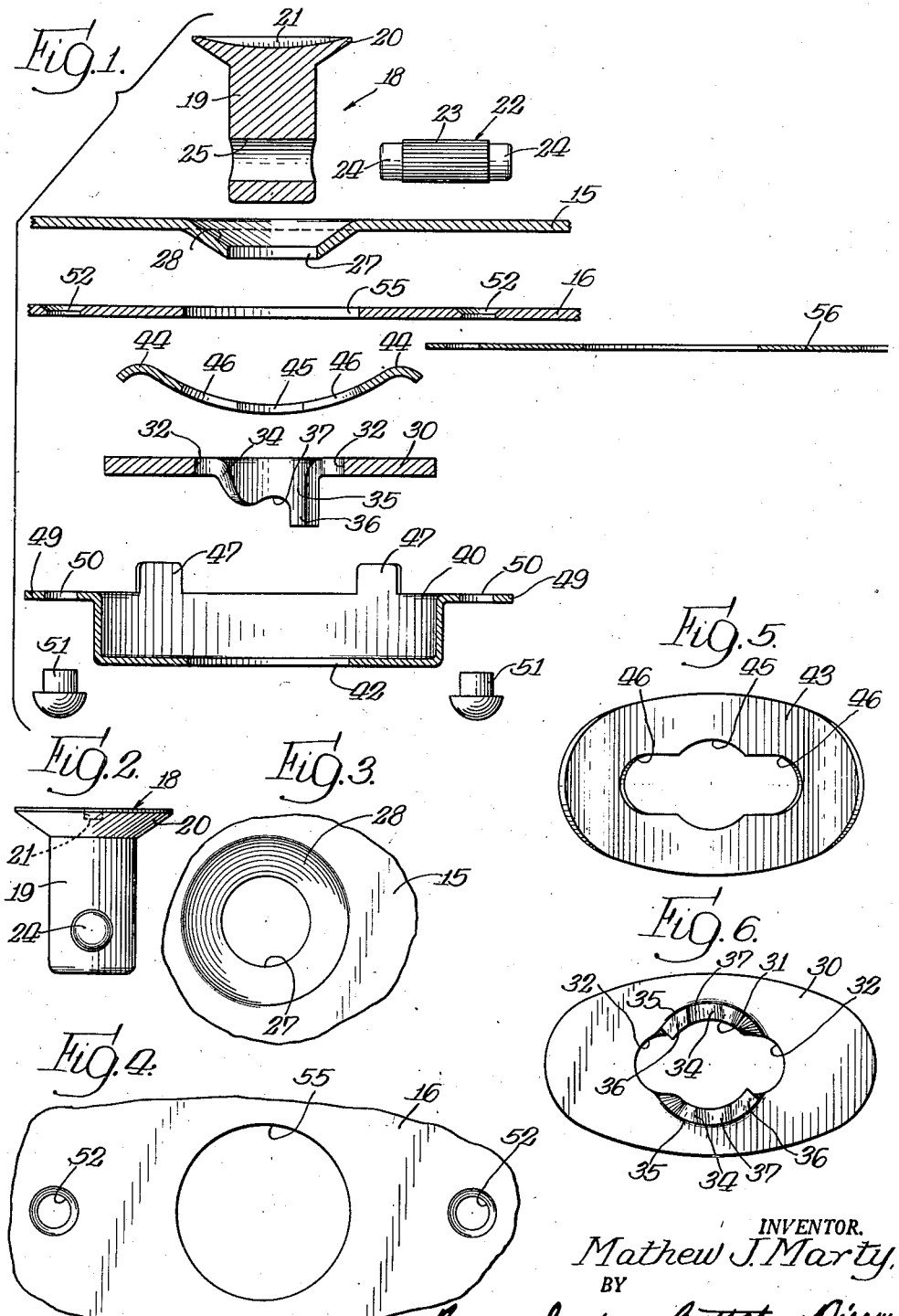
INVENTOR.
Mathew J. Marty,
BY
Brown, Jackson, Boettcher & Dienner
Attys.

Dec. 21, 1943.    M. J. MARTY    2,337,483
FASTENING DEVICE
Filed July 10, 1942    2 Sheets-Sheet 2
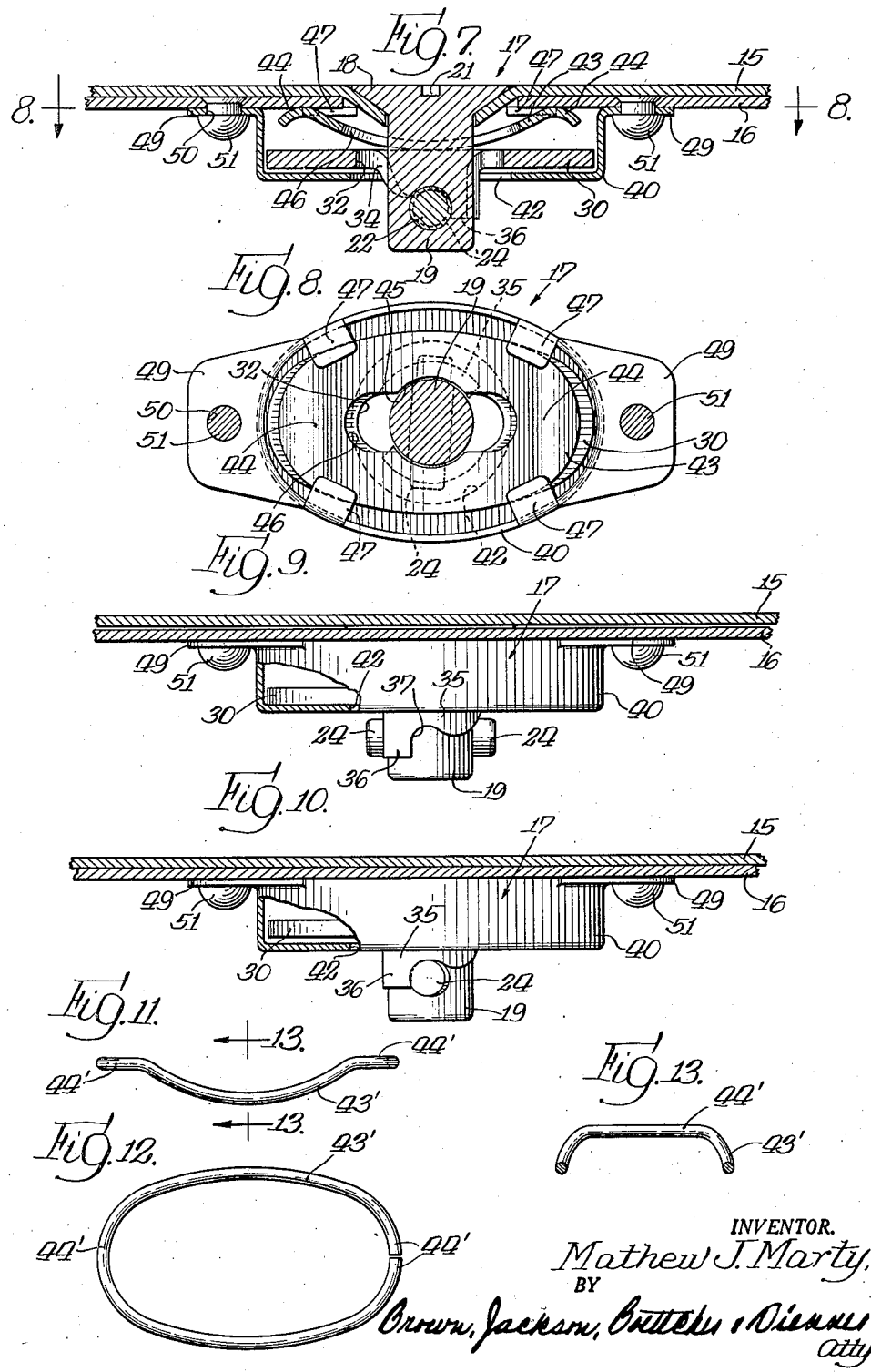
INVENTOR.
Mathew J. Marty,
BY
Brown, Jackson, Boettcher & Dienner
attys.

Patented Dec. 21, 1943

2,337,483

UNITED STATES PATENT OFFICE 2,337,483

FASTENING DEVICE

Mathew J. Marty, Chicago, Ill.

Application July 10, 1942, Serial No. 450,388

8 Claims. (Cl. 24—221)

The present invention relates to a fastening device and more particularly to a fastening device for detachably securing two parts together. The invention is particularly adapted for use in detachably securing two plates or panel members together, for example, the cowlings of airplanes and other parts thereof.

The fastening device of my invention is of the class comprising a pair of fastening elements adapted to be interlocked by rotating one of the elements relative to the other. Fasteners of this character have been long known in the art and have been extensively used in the construction of airplanes, particularly in connection with the cowlings thereof. However, so far as I am aware, the present known forms of fastening devices are unsatisfactory, for several reasons. Most of the known devices now in use are of the type in which the fastening element carried by a fixed part of the airplane comprised a spring element which is permanently fixed to that part and which is adapted to coact with a rotatable element carried by a detachable part to yieldingly retain the parts together. These spring elements are generally formed with coils at the ends thereof and are connected to one of the parts by means of rivets extending through the end loop of each coil. The coiled ends are provided to increase the resiliency of the spring, but since the ends of the spring are fixed it nevertheless is flexed by opening and closing of the fastening device causing the spring to lose its resiliency and resulting in frequent breakage after it has been in use only a short time. Removal and replacement of defective springs of this character is difficult and costly and hence unsatisfactory.

According to my present invention I propose to provide a rotatable fastening element adapted to be associated with the detachable panel or plate comprising a shank extending through an opening in the plate provided therefor and having an enlarged head at one end and a pin extending transversely of the longitudinal axis of the shank at the other end thereof. Preferably, the metal surrounding the opening provided in the panel for the rotatable element is bevelled to correspond to the bevelled surface of the head so that the outer end thereof may be positioned to lie substantially flush with the surface of the plate member. A second or non-rotatable fastening element of a character adapted to be engaged by the rotatable element to be interlocked therewith upon rotation thereof is preferably disposed in a housing or carrier member which is suitably secured to the other plate or panel member. The second fastening element is confined within the housing or carrier member against rotation but is free to move longitudinally of the axis of the shank of the rotatable element. A suitable spring element or other resilient means is also preferably disposed within the housing and confined therein against rotation, but it is not mechanically secured to any of the other elements of the fastening device nor to either of the parts to be secured together. It will be observed that with this construction the housing, the second or non-rotatable fastening element, and the spring may be assembled as a unit for convenient ultimate assembly to an airplane. When it is desired to secure the plate or panel members together the rotatable element is positioned so that the pin thereof engages cam surfaces formed on the non-rotatable fastening element to compress the spring and bias the plates together. Since the spring is simply confined and is not mechanically connected to any other part it retains its resiliency and mechanical strength for a long period of time and may be flexed and deformed many times without breaking or losing its resiliency.

It is an object of my invention, therefore, to provide a fastening device of the character above noted which incorporates a novel arrangement of one of the fastening elements and a resilient means associated therewith which overcomes the objections to the devices of the prior art.

A further object of my invention is to provide a fastening device of the character noted in which certain of the parts may be assembled at the place of manufacture for convenient shipping and ultimate assembly upon devices in which it is desired to detachably secure parts thereof together.

A further object is to provide a simple, sturdy and inexpensive fastening device of the character noted.

Other objects and advantages will appear from the detail description.

It will be understood that the invention is applicable for use in other instances than airplane cowlings, but it is particularly useful in this field and hence it will be understood that the following description is only illustrative of one application of the invention.

Now, in order to acquaint those skilled in the art with the manner of constructing and operating a device in accordance with the teachings of my invention I shall disclose in conjunction with the accompanying drawings a preferred embodiment of the invention.

In the drawings:

Figure 1 is a sectional view through the several parts of the fastening device of the present invention spaced apart and in disassembled relation and showing a pair of plate members in section which are adapted to be secured together by the fastening device herein disclosed;

Figure 2 is an elevational view of the rotatable fastening element of the present invention;

Figure 3 is a plan view of a portion of one of the plate members with which the rotatable fastening element of Figure 2 is adapted to be associated;

Figure 4 is a plan view of a second plate member which is adapted to be detachably secured to the plate member of Figure 3 by the fastening device of the present invention;

Figure 5 is a bottom view of a spring element adapted to be associated with the second fastening element of the fastening means of my invention;

Figure 6 is a bottom view of a second or non-rotatable fastening element adapted to coact with the rotatable element of Figure 2;

Figure 7 is a detail sectional view through a pair of plate members and the detachable fastening means of the present invention in the interlocked position of the fastening elements;

Figure 8 is a view taken substantially on the line 8—8 of Figure 7, and looking in the direction indicated by the arrows;

Figure 9 is a side elevational view showing a pair of plate members in section to which the fastening device of the present invention has been applied, a portion of the housing of the latter being broken away to show the position of the non-rotatable fastening element in the open or unlocked position of the device;

Figure 10 is a view corresponding to Figure 9 but showing the fastening elements in their interlocked position;

Figure 11 is a side elevational view of a modified form of spring element which may be substituted in the device for the form of spring element shown in Figure 3;

Figure 12 is a plan view of the spring means of Figure 11; and

Figure 13 is a detail sectional view taken on the line 13—13 of Figure 11, and looking in the direction indicated by the arrows.

In the several views of the drawings I have shown a pair of plate members 15 and 16 which are adapted to be detachably secured together by the fastening means 17 of my present invention. For purposes of this disclosure the fastening means 17 will be described in conjunction with the cowling of an airplane, and it will be understood that the plate or panel 15 comprises or represents the removable cowling and the plate member or panel 16 comprises a portion of the body of the airplane to which the cowling 15 is adapted to be removably attached. The fastening means 17 comprises a rotatable fastening element 18 having a shank portion 19 at one end of which an enlarged head 20 is formed with a screwdriver kerf 21 for receiving a screwdriver to rotate this element. A pin 22 extends transversely of the longitudinal axis of the shank portion 19 at the other end thereof and is provided with an intermediate serrated portion 23 and end annular portions 24. The serrated portion 23 fits in the cylindrical opening 25 formed in the end of the shank 19 opposite the head 20 and the teeth formed by the serrations 23 bite into the metal of the shank 19 to securely retain the pin 22 in position. The rotatable fastening element 18 is adapted to be assembled with the plate 15 by inserting the shank portion 19 through the aperture 27 and then inserting the pin 22 as described. Pin 22 is of greater length than the diameter of the hole 27 and retains the assembly of the fastening element 18 with panel 15. Preferably the plate 15 is bevelled at 28 surrounding the opening 27 at an angle which corresponds to the angle of the annular bevelled surface of the head portion 20 so that the head portion is adapted to lie substantially flush with the outer surface of the plate or panel 15, in the closed position of the fastener device, as will be clear from Figures 7, 9 and 10. A second or non-rotatable fastening element 30 comprises a plate member having an opening 31 for receiving the shank 19 of the rotatable fastening element 18 and a pair of diametrically opposed slots 32 extend into the plate 30 from the opening 31. A pair of oppositely inclined cam surfaces 34 are formed on the edges of flange elements 35 extending normal to the plate member 30 defining the opening 31 and are provided with stop portions 36 and recesses 37 adjacent the stop portions 36 at the high point of the cam surfaces for a purpose which will appear hereinafter. The plate member 30 is substantially elliptical when viewed in plan and is adapted to be disposed in a housing 40, also elliptical when viewed in plan, to prevent substantial rotational movement of the plate member 30 in the housing 40. The flanges 35 extend through the base of the housing 40 through an opening 42 therein. A thin spring metal plate 43, also substantially elliptical when viewed in plan, is provided with rounded end bearing portions 44. The plate 43 is formed with an opening 45 and a pair of diametrically opposed slots 46 extend outwardly of the opening 45 longitudinally into the plate 43. The second or non-rotatable fastening element 30 and the spring element 43 are disposed in the housing 40 in the position shown in Figures 7 and 8 of the drawings and the lugs 47 formed integrally with the side walls of the housing are turned inwardly to secure the spring and second or non-rotatable fastening element 30 in position within the housing 40. A pair of tongue members 49 are formed integrally with the housing and are provided with openings 50 through which rivets 51 extend therethrough and into openings 52 suitably formed in the plate member 16 and the rivets are then peened over to secure the assembled unit to the plate or panel 16.

With the rotatable fastening element 18 assembled to the plate 15 as described, and with the housing 40 including the non-rotatable fastening element 30 and the spring element 43 assembled therein and secured to the plate member 16, it will be seen that the plate members 15 and 16 may be detachably secured together by inserting the shank portion 19 and pin 22 through the opening 55 of plate member 16, through the opening 45 and slots 46 of the spring element 43, and the opening 31 and slots 32 of the non-rotatable fastening element 30, and then rotating the fastening element 18 to cause the ends 24 of the pin 22 to ride up the cam surfaces 34 whereupon the spring 43 is compressed urging the plate 15 toward the plate 16 to bias them together. The ends 24 of the pin 22 engage the stops 36 of the flanges 35 to prevent turning movement of the fastening element 18 beyond the interlocked position of the elements and the ends 24 rest in the recesses 37 to prevent retrograde movement of the rotatable fastening element 18.

In Figure 1 I have shown a shim 56 which may, if desired, be interposed between the plate 16 and housing or carrier 40. The shim is of course provided with suitable openings to permit insertion of the rotatable element 18 and to receive the rivets 51.

In the assembled position of the fastening elements the rounded end portions 44 of the spring element 43 bear against the adjacent surface of the plate member 16 to bias the plate 15 toward the fixed plate 16. It will be observed that the fastening element 30 and the spring 43 are restrained by the housing against rotation, and that this fastening element 30 may move axially of the longitudinal axis of the shank portion 19 of the rotatable fastening element 18 to thereby compress the spring element 43. It will be observed, therefore, that the non-rotatable fastening element 30 and the spring 43 are not mechanically secured to any of the parts but are movable within the housing 40 in a direction axially of the axis of the rotatable element 18. Referring to Figures 9 and 10, it will be seen that in Figure 9 the fastening elements are shown in their disengaged position with the apertured plate member 30 seated on the base of the housing 40 and in Figure 10 the elements have been engaged so that the non-rotatable element 30 has been moved off of the base of the housing 40 compressing the spring 43 to bias the plates 15 and 16 together.

In Figures 11 through 13 I have shown a modified form of spring element 43' which comprises an elliptical loop of spring metal of circular cross-section. The spring loop 43' is formed with relatively flat end portions 44' which when substituted in the housing 40 act in much the same manner as the curved end portions 44 of the spring element 43 in the embodiment of the invention disclosed in Figures 1 through 10.

While I have shown what I consider to be the preferred embodiments of my invention, it will be understood that various modifications and re-arrangements may be made therein without departing from the scope of my invention.

I claim:

1. A fastening device for detachably securing two panels together comprising, a rotatable fastening element comprising a shank portion extending through an opening in one of said panels and having an enlarged substantially flat head at one end adapted to lie substantially flush with said one panel, and a pin extending transversely of the longitudinal axis of said shank at the other end thereof, a housing fixed to the other of said panels, said housing and said other panel being apertured to receive said rotatable fastening element, a second fastening element disposed within said housing and comprising an apertured plate member having cam surfaces adapted to be engaged by said pin upon turning of said rotatable fastening element to interlock said fastening elements, said plate member being movable axially of said shank within said housing and confined therein against rotational movement, and resilient means within said housing intermediate said second fastening element and said other panel adapted to be compressed in the interlocked position of said fastening elements to bias said panels together.

2. A fastening device for detachably securing two parts together comprising, a rotatable fastening element extending through an opening in one of said parts comprising a shank portion having an operating head at one end and a pin extending transversely of the longitudinal axis of said shank at the other end thereof, a housing fixed to the other of said parts, said housing and said other part being apertured to receive said rotatable fastening element, a second fastening element disposed within said housing and comprising an apertured plate member having cam surfaces adapted to be engaged by said pin upon turning of said rotatable fastening element to interlock said fastening elements, said plate member being movable longitudinally of said shank within said housing and confined therein against rotational movement, and resilient means intermediate said second fastening element and said other part confined within said housing and adapted to be compressed in the interlocked position of said fastening elements to bias said panels together.

3. A fastening device for detachably securing two parts together comprising, a rotatable fastening element associated with one of said parts, a housing adapted to be fixed to the other of said parts, a second fastening element confined within said housing, said second fastening element and said housing being formed to prevent relative rotational movement therebetween said fastening elements being of a character to interlock with each other upon rotational movement of said rotatable element with respect to said second fastening element, and spring means disposed within said housing intermediate said second fastening element and said other part and confined therein for biasing said parts toward each other when said elements are interlocked.

4. A fastening device for detachably securing two parts together comprising, a rotatable fastening element extending through an opening in one of said parts comprising a shank portion having an operating head at one end and a pin extending transversely of the longitudinal axis of said shank at the other end thereof, a housing fixed to the other of said parts, said housing and said other part being apertured to receive said rotatable fastening element, a second fastening element disposed within said housing and comprising an apertured plate member having cam surfaces disposed externally of said housing adapted to be engaged by said pin upon turning of said rotatable fastening element to interlock said fastening elements, said plate member being movable longitudinally of said shank within said housing, said plate member and said housing being formed to prevent rotation of said second fastening element relative to said housing, and resilient means within said housing intermediate said second fastening element and said other part and adapted to be compressed in the interlocked position of said fastening element to bias said panels together, said cam surfaces having means for resisting retrograde movement of said rotatable element when disposed in interlocked position.

5. A fastening device for detachably securing two parts together comprising, a rotatable fastening element extending through an opening in one of said parts comprising a shank portion having an operating head at one end and a pin extending transversely of the longitudinal axis of said shank at the other end thereof, a housing fixed to the other of said parts, said housing and said other part being apertured to receive said rotatable fastening element, a second fastening element disposed within said housing and comprising an apertured plate member having cam surfaces disposed externally of said housing adapted to be engaged by said pin upon turning of said rotatable fastening element to interlock said fastening elements, said plate member being movable longitudinally of said shank within said housing, said plate member and said housing being formed to prevent rotation of said second fastening element relative to said housing, and resilient means disposed within said housing intermediate said second fastening element and said other part and adapted to be compressed in the interlocked position of said fastening element to bias said panels together, said cam surfaces having stops at the ends thereof for limiting turning movement of said rotatable element with respect to said plate member, and having recessed portions adjacent said stops for receiving said pin for resisting retrograde movement of said rotatable element when the latter is disposed in its interlocked position.

6. A fastening device for detachably securing two parts together comprising a rotatable fastening element associated with one of said parts, a housing adapted to be fixed to the other of said parts, a second fastening element having a first portion within said housing and a second portion disposed externally of said housing, said first portion of said second fastening element and said housing being formed to prevent rotation of said second fastening element relative to said other part, said rotatable fastening element and said second portion of said second fastening element being of a character to interlock with each other upon rotational movement of said rotatable fastening element with respect to said second fastening element, and a bowed spring member disposed within said housing and confined intermediate said second fastening element and said other part for urging said parts toward each other in the interlocked position of said fastening elements.

7. The fastening device of claim 6 characterized by said bowed spring member having rounded end portions engaging the adjacent surface of the second part.

8. A fastening device for detachably securing two parts together comprising, a rotatable fastening element associated with one of said parts, an assembly comprising a second fastening element associated with said other part, said second fastening element being non-rotatable with respect to said other part and being movable toward and away from said other part, and resilient means intermediate said second fastening element and said other part, said rotatable fastening element and said second fastening element being of a character to interlock with each other upon rotational movement of said rotatable fastening element with respect to said second fastening element, said second fastening element being adapted to be shifted toward said other part upon interlocking of said fastening elements compressing said resilient means whereby in the interlocked position of said fastening elements said parts are urged toward each other.

MATHEW J. MARTY.